United States Patent Office 3,798,277
Patented Mar. 19, 1974

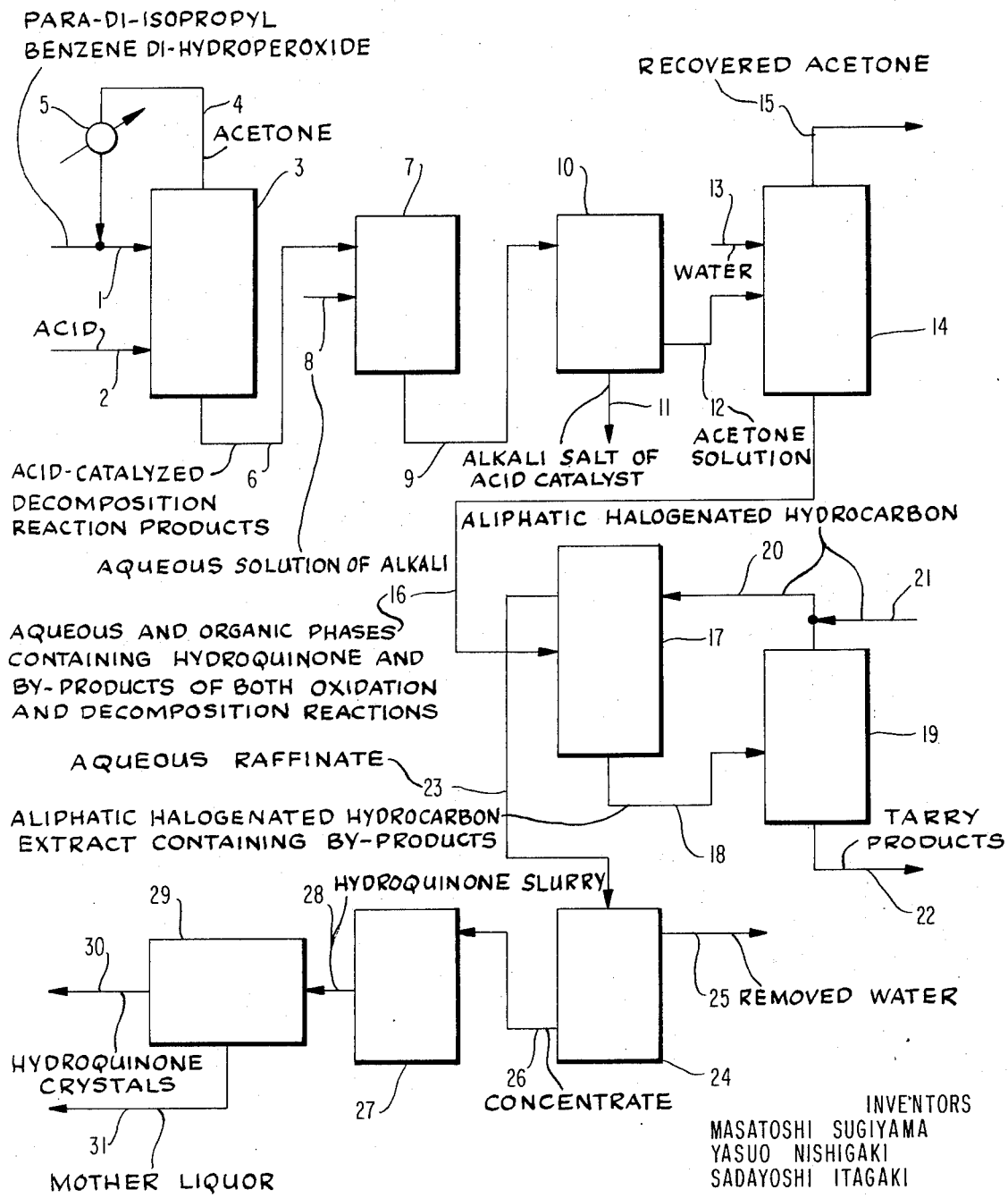

3,798,277
PROCESS FOR THE PREPARATION OF
HYDROQUINONE
Masatoshi Sugiyama, Yasuo Nishigaki, and Sadayoshi Itagaki, Kanagawa, Japan, assignors to Fuji Photo Film Co., Ltd., Kanagawa, Japan
Filed June 18, 1971, Ser. No. 154,334
Claims priority, application Japan, June 18, 1970, 45/52,986
Int. Cl. C07c 37/08
U.S. Cl. 260—621 C                         13 Claims

ABSTRACT OF THE DISCLOSURE

A process for obtaining hydroquinone is disclosed wherein the decomposition reaction products of para-di-isopropyl benzene di-hydroperoxide in the presence of an acid is neutralized with an alkali, the precipitated alkali salt of the acid is filtered off, the acetone is distilled off, the residue is extracted with an aliphatic halogenated hydrocarbon, and finally, the resulting hydroquinone is separated from the residual aqueous solution left on the extraction.

BACKGROUND OF THE INVENTION

Field of the invention

The present invention relates to a process for the preparation of hydroquinone by the acid-catalyzed decomposition of para-di-isopropyl benzene di-hydroperoxide.

More particularly, this invention relates to the recovery and purification of hydroquinone formed by the decomposition of para-di-isopropyl benzene di-hydroperoxide using an acid, such as sulfuric acid, as a catalyst.

We have been engaged in the study on a profitable process for the recovery and purification of hydroquinone, in industrially satisfactory yields, from the decomposition reaction product of para-di-isopropyl benzene di-hydrobenzene. We have found a simple means for the recovery peroxide obtained from the oxidation of para-di-isopropyl and purification of hydroquinone, which has enabled us to provide a novel, industrially profitable process for the manufacture of the hydroquinone.

SUMMARY OF THE INVENTION

The present invention is concerned with a process for preparing hydroquinone, which comprises the steps of (a) contacting para-di-isopropyl benzene di-hydroperoxide with an acid in solution, (b) neutralizing the decomposition reaction products with an aqueous alkaline solution, (c) separating the resulting alkali salt of the acid, (d) distilling off the acetone therefrom, (e) extracting the residue with an aliphatic halogenated hydrocarbon, and (f) recovering hydroquinone from the aqueous raffinate.

In accordance with the present invention, even if low grade para-di-isopropyl benzene di-hydroperoxide is used as the starting material, there can be obtained a high grade of hydroquinone. The fact that a crude starting material can be used makes it possible to shorten the purification step of the para-di-isopropyl benzene di-hydroperoxide in an oxidation process and furthermore to minimize any tranferring loss of said di-hydroperoxide from the oxidation to the decomposition processes. Moreover, in an acid-catalyzed decomposition of high purity of said di-hydroperoxide, by-products are always formed, so that the hydroquinone is contaminated. In accordance with the present invention, however, by-products and contamination in both oxidation and decomposition processes can be completely eliminated with a single purifying operation.

When pure para-di-isopropyl benzene di-hydroperoxide is used, the process according to this invention becomes, of course, readily employed and enables one to produce a high grade of hydroquinone in high yields.

There has been known in the past some literature concerning the preparation of hydroquinone by acid-decomposing para-di-isopropyl benzene di-hydroperoxide. However, in the acid-catalyzed decomposition reaction, there are formed many kinds of by-products which contaminate hydroquinone to a great extent, so that it is difficult to produce a high grade of hydroquinone. In industrial practice, such a method for manufacturing hydroquinone from para-di-isopropyl benzene di-hydroperoxide had been regarded as substantially impossible.

In addition, hydroquinone containing impurities or moisture discolors upon storage and may not be purified by any known process.

The present process is characterized as (a) neutralizing with an aqueous alkaline solution an acid present in the decomposition reaction products, (b) removing the resulting alkali salt of the acid from the mixture, (c) distilling the acetone therefrom, (d) extracting the residual aqueous solution with an aliphatic halogenated hydrocarbon to remove by-products therefrom, and (e) subsequently concentrating the aqueous solution to give a high grade of hydroquinone.

DETAILED DESCRIPTION OF THE INVENTION

According to the present invention, the acid-catalyzed decomposition of para-di-isopropyl benzene di-hydroperoxide may be advantageously initiated in the present of acetone. In one embodiment, para-di-isopropyl benzene di-hydroperoxide is mixed with acetone in the range from 5 to 70% by weight, preferably 15 to 60% by weight. It is economical to use the acetone resulting from the acid-catalyzed decomposition of para-di-isopropyl benzene di-hydroperoxide.

As the acid catalyst, there may be employed acidic compounds, such as sulfuric acid, hydrochloric acid and paratoluene sulfonic acid, of which sulfuric acid is particularly preferred. The concentration of sulfuric acid is preferably in the range from 5 to 15% by weight which is produced by dilution of about 30–98% by weight of sulfuric acid with acetone.

Into a decomposition reactor are charged both a solution or a slurry of para-di-isopropyl benzene di-hydroperoxide and that of an acid in acetone from a continuously adding apparatus at such a rate that the concentration of the acid will be in the range from 0.1 to 2% by weight. The solution or slurry is warmed with hot water circulating round the external wall of the reactor, the water being at a temperature from 50 to 80° C., in order to maintain the boiling point of the reaction mixture.

The alkali employed in the neutralization step may include, for example, sodium hydroxide, potassium hydroxide, sodium carbonate, potassium carbonate, sodium bicarbonate and potassium bicarbonate. These may be preferably used in the form of an aqueous solution thereof and in a concentration from 5 to 20% by weight. The alkali salts of the acid catalysts formed during the neutralization step are insoluble in acetone and thus precipitate in the cleavage mixture. The alkali treatment may be carried out continuously or in a batchwise manner. After removing the so precipitated alkali salts of the acid catalyst, the solution is introduced into an acetone distillation apparatus. On extraction with an aliphatic halogenated hydrocarbon, it is required that a certain amount of water be present therein. As the amount of water contained in the aqueous alkali solution used in the neutralization step is insufficient for the extraction treatment, an additional amount of water may be added to the solution. The total volume of water in the solution may be such that it dissolves a theoretical yield of hydroquinone to give an aqueous solution thereof in a concentration from 3 to 30% by weight and preferably from 5 to 20% by weight.

The oxidation by-products and acid-catalyzed decomposition by-products in the residue after distilling off acetone may be extracted with aliphatic halogenated hydrocarbons, such as methylene chloride, chloroform, carbon tetrachloride, dichloroethane, trichloroethylene, dibromoethane, trichlorotrifluoroethane and bromethane. The extraction with the aliphatic halogenated hydrocarbons may be suitably carried out in a counter current, at a temperature between 15° C. and 100° C. and preferably between 20° C. and 70° C.

From the residual aqueous solution, after the extraction with the aliphatic halogenated hydrocarbon, hydroquinone is recovered. The aqueous solution may be concentrated under atmospheric or reduced pressure at a temperature below 80° C. and preferably below 60° C.

An embodiment of the process just described given by way of example may be seen from the attached schematic diagram.

DETAILED DESCRIPTION OF THE DRAWINGS

Para-di-isopropyl benzene di-hydroperoxide is introduced through piping 1 into a decomposition reactor 3, where said di-hydroperoxide is decomposed by an acid charged through piping 2. Acetone vapor passes through piping 4 and is cooled at a cooling apparatus 5. The acid-catalyzed decomposition reaction products are taken out through piping 6 to feed to a neutralizing tower 7. In tower 7, neutralization is carried out by the addition of an aqueous solution of an alkali through piping 8 and the alkali salt of the acid catalyst is precipitated out. The mixture in tower 7 is then cooled to 5° C. and fed through piping 9 into a separator 10 where the alkali salt is separated and taken out from 11. The acetone solution is fed through piping 12 into an aceton distilling tower 14 and simultaneously water is fed through piping 13. Acetone is recovered therefrom through piping 15. At the bottom of this tower 14 the aqueous and organic phases containing hydroquinone and the by-products of both oxidation and decomposition reactions are fed through piping 16 into the counterstream extracting column 17 where said mixture is extracted with an aliphatic halogenated hydrocarbon fed through piping 20 therein; the by-products are thereby extracted with the aliphatic halogenated hydrocarbon. The aliphatic halogenated hydrocarbon extract containing the by-products therein is withdrawn from the bottom of the column 17 through piping 18 into a distilling column 19 where the hydrocarbon is recovered and led back to the extracting column 17. Tarry products at the bottom of the column 19 are taken out through pipe 22. The aliphatic halogenated hydrocarbon is supplied through piping 21 if necessary. The aqueous raffinate is led from the top of the column 17 to the concentrator 24 by pipe 23 where water is removed under reduced pressure through 25. The concentrate is introduced through piping 26 into the crystallizing tank 27 where hydroquinone is crystallized. The slurry of hydroquinone is led through piping 28 into the crystal separator 29 where crystals are separated, which are taken from 30. The mother liquor is also taken through pipe 31.

A better understanding of the present invention will be obtained from the following examples, which are merely illustrative and not limitative of the present invention.

EXAMPLE 1

A solution of crude para-di-isopropyl benzene di-hydroperoxide (897 g., 75.1% content by weight) in acetone (2500 g.) and 10% by weight of a solution of sulfuric acid in acetone obtained from dilution of 30% by weight of sulfuric acid with acetone were fed to a jacketed flask (400 cc. volume) equipped with a reflux condenser and a stirrer at a rate of 480 cc./hr. and 120 cc./hr., respectively. The mean residence time in the flask was 40 minutes. Hot water (61° C.) was circulated in the jacket and the contents of the flask were kept at boiling point of the reaction mixture. At a level of 400 cc. of the flask was mounted an overflow tube through which the decomposition reaction products were introduced into a receiver. The overflowed products were neutralized with 8% by weight of an aqueous sodium hydroxide solution and cooled to 5° C. to precipitate sodium sulfate, which was filtered off. The filtrate was then fed to a distillation apparatus to which 4340 g. of water was added so as to dissolve the theoretical yield of hydroquinone to give about 7% by weight of an aqueous solution after removal of acetone. Acetone was distilled off under atmospheric pressure. The resulting products were contacted in a countercurrent with chloroform at 30° C. to provide an aqueous hydroquinone solution. The aqueous solution was concentrated below 60° C. under reduced pressure until crystals precipitated out. The resulting mixture was slowly cooled to 20° C. to give colorless needles, M.P. 170–171° C.

According to this process, 295 g. of hydroquinone (90.5% based on the theoretical amount and 99.6% purity based on titration with cerium sulfate) was obtained from 897 g. of para-di-isopropyl benzene di-hydroperoxide (75.1% content by weight).

EXAMPLES 2 TO 7

The procedure of Example 1 was repeated except that the aliphatic halogenated hydrocarbons shown in Table 1 were employed in place of chloroform. The results are shown in Table 1.

TABLE 1

| Ex. | Aliphatic halogenated hydrocarbon | Hydroquinone, percent | |
|---|---|---|---|
| | | Yield | Purity |
| 2 | Methylene chloride | 90.7 | 99.5 |
| 3 | Trichloroethylene | 91.0 | 99.8 |
| 4 | 1,2-dibromoethane | 90.6 | 99.6 |
| 5 | 1,1,2-trichloro-1,2,2-trifluoroethane | 91.2 | 99.7 |
| 6 | 1-bromoethane | 90.1 | 99.5 |
| 7 | 1,2-dichloroethane | 91.2 | 99.7 |

Although the present invention has been adequately described in the foreoing specification and claims, it is readily apparent that various changes and modification can be made without departing from the scope and spirit thereof.

What is claimed is:

1. A process for preparing hydroquinone which comprises the steps of:
    (a) decomposing para-di-isopropyl benzene-di-hydroperoxide in acetone in the presence of sulfuric acid,
    (b) neutralizing the decomposition reaction products of said di-hydroperoxide by the addition thereto of an aqueous alkali solution,
    (c) removing the alkali salt of said sulfuric acid therefrom by filtration,
    (d) adding thereto a sufficient amount of water to solubilize the hydroquinone in the reaction mixture,
    (e) distilling off the acetone therefrom,
    (f) extracting the resulting residue with an aliphatic halogenated hydrocarbon, and
    (g) separating the hydroquinone crystallized out from the residual aqueous solution.

2. The process of claim 1, wherein said aliphatic halogenated hydrocarbon has 1 to 3 carbon atoms.

3. The process of claim 2, wherein said aliphatic halogenated hydrocarbon is chloroform.

4. The process of claim 2, wherein said aliphatic halogenated hydrocarbon is trichloroethylene.

5. The process of claim 2, wherein said aliphatic halogenated hydrocarbon is 1,2-dichloroethane.

6. The process of claim 1, wherein said acid decomposition reaction products are obtained in the presence of acetone in an amount of from 5% to 70% by weight.

7. The process of claim 6, wherein said amount ranges from 15% to 60% by weight.

8. The process of claim 1, wherein said alkali is a member selected from the group consisting of NaOH, KOH, $Na_2CO_3$, $K_2CO_3$, $NaHCO_3$ and $KHCO_3$ 9. The process of claim 1 wherein said alkali is in an aqueous solution at a concentration of from 5% to 20% by weight.

10. The process of claim 1, wherein the extraction temperature ranges from 15° C. to 100° C.

11. The process of claim 10, wherein said extraction temperature ranges from 20° C. to 70° C.

12. The process of claim 1, wherein the amount of water present in step (d) is such that the concentration of said hydroquinone ranges from 3.0 to 30.0 percent by weight, based on the theoretical amount of hydroquinone obtainable.

13. The process of claim 1, wherein the decomposition reaction of step (a) is carried out in the presence of a sulfuric acid concentration of from 0.1 to 2.0 percent by weight.

References Cited
UNITED STATES PATENTS

| | | | |
|---|---|---|---|
| 2,748,172 | 5/1956 | Rodgers | 260—621 C |
| 3,376,352 | 4/1968 | Domenicali et al. | 260—621 C |

LEON ZITVER, Primary Examiner

N. MORGENSTERN, Assistant Examiner

U.S. Cl. X.R.

260—593 A